April 8, 1930.  F. HIMMEL ET AL  1,753,829
MACHINE FOR FORMING STRIPS FOR STORE FRONT CONSTRUCTION
Filed May 1, 1929
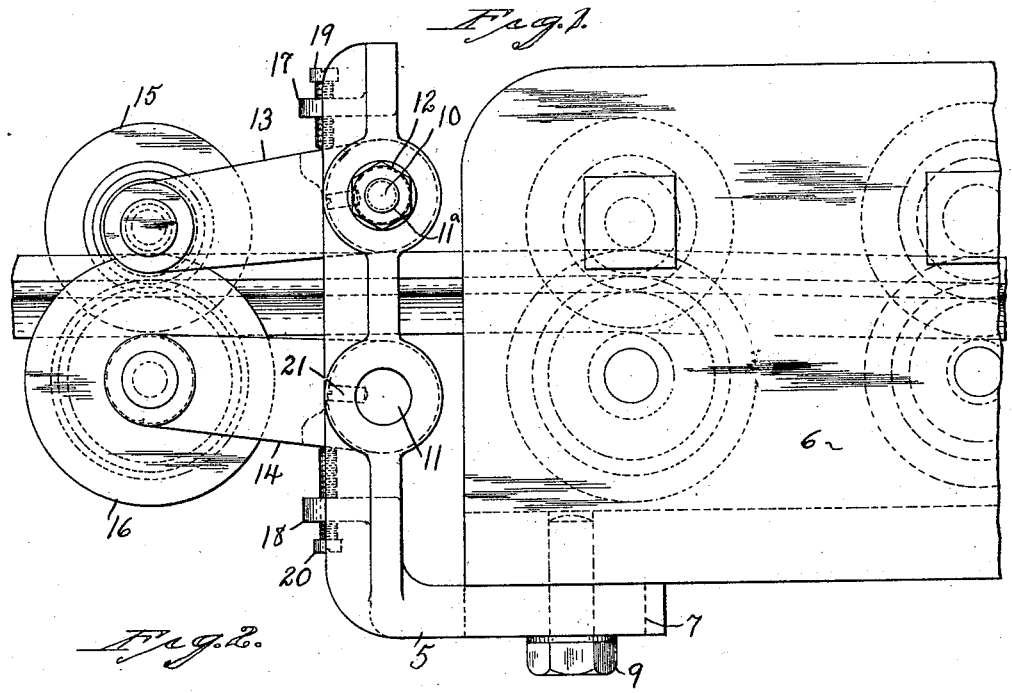

Patented Apr. 8, 1930

1,753,829

UNITED STATES PATENT OFFICE

FRED HIMMEL AND ISIDORE HIMMEL, OF NEW HAVEN, CONNECTICUT, ASSIGNORS TO THE HIMMEL BROTHERS CO., OF NEW HAVEN, CONNECTICUT, A CORPORATION

MACHINE FOR FORMING STRIPS FOR STORE-FRONT CONSTRUCTION

Application filed May 1, 1929. Serial No. 359,530.

Strips for store-front construction, if made from sheet-metal, are formed by passing them between a series of rolls having the desired configuration so as to give the strip the necessary shape, but as these strips pass from the machine there is a tendency to curve either up or down or to the right or to the left.

The object of this invention is to provide a strip-forming machine with means to overcome any tendency to curvature or, if desired, to effect a curvature in one direction or another, and the invention consists in the construction as hereinafter described and particularly recited in the claims.

In the accompanying drawings:

Fig. 1 is a side view of a machine for forming strips for store-front construction constructed in accordance with our invention;

Fig. 2 is a front view of the same; and

Fig. 3 is an underside view of the device detached and on a small scale.

In carrying out our invention we employ a frame 5 which is attached to the bed 6 of a strip-forming machine, the details of which are unnecessary to explain further than that it consists of a series of rollers arranged in pairs between which the strip is passed. This frame 5 is formed with curved slots 7 and 8 through which bolts 9 extend so that the frame may be moved with relation to the bed of the machine. Mounted in the frame are horizontal shafts 10 and 11 which are permitted a certain amount of longitudinal movement by providing one of them with threaded ends 11ª to receive nuts 12 whereby the shaft 10 may be adjusted. When the shaft 10 is properly adjusted the shaft 11 will be moved to the desired position where it is locked to the frame 5 by a set-screw 21. On the shafts are mounted yokes 13 and 14 and these yokes carry rollers 15 and 16, the conformation of which corresponds to the desired conformation of the strip being formed. The frame is also provided with lugs 17 and 18 carrying set-screws 19 and 20 which bear upon the yokes 13 and 14, so that by turning one screw out and the other screw in the yokes may be raised or lowered.

The strip having been suitably formed passes from the forming machine between the rollers 15 and 16. The rollers, if properly adjusted, and the frame also properly adjusted, will correct any tendency to curvature and deliver a straight strip. In some cases, however, it is desirable that the strip should be curved, in which case the frame or the yokes will be adjusted so as to give the strip the desired curve in one direction or another.

While the machine shown is especially designed for sheet-metal strips, extruded metal strips may also be straightened or curved with a similar mechanism except that it will be made heavier, so as to withstand the strain imposed upon it by strips of extruded metal.

We claim:

1. Means for overcoming tendency to curvature or to cause curvature in strips of metal, comprising a bending machine bed, a frame adjustably mounted on said bed, yokes adjustably mounted in said frame, complementary rollers mounted in said yokes, and means for effecting upward or downward movement of said yokes.

2. Means for overcoming tendency to curvature or to cause curvature in strips of metal, comprising a machine bed, a frame adjustably mounted on said bed, two parallel shafts mounted in said frame and adapted to be longitudinally adjusted, a yoke mounted on each of said shafts, a roller of desired conformation mounted in each of said yokes, and screws supported by said frame and bearing against said yokes, whereby they may be raised or lowered.

In testimony whereof, we have signed this specification.

FRED HIMMEL.
ISIDORE HIMMEL.